United States Patent
Peter (10) Patent No.: US 10,963,538 B2
(45) Date of Patent: Mar. 30, 2021

(54) CLIENT APPLICATION FOR WEB APPLICATION EXECUTION

(71) Applicant: salesforce.com, inc., San Francisco, CA (US)

(72) Inventor: Wesley Peter, Sammamish, WA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/528,566

(22) Filed: Jul. 31, 2019

(65) Prior Publication Data
US 2021/0034694 A1     Feb. 4, 2021

(51) Int. Cl.
*G06F 16/958* (2019.01)
*G06F 16/904* (2019.01)

(52) U.S. Cl.
CPC .......... *G06F 16/972* (2019.01); *G06F 16/904* (2019.01)

(58) Field of Classification Search
CPC .............................. G06F 16/972; G06F 16/904
See application file for complete search history.

(56) References Cited

U.S. PATENT DOCUMENTS

| | | | | |
|---|---|---|---|---|
| 8,990,710 B1* | 3/2015 | Warner | ...................... | G06F 8/34 |
| | | | | 715/760 |
| 9,223,599 B1* | 12/2015 | Racanelli | ............. | G06F 9/45512 |
| 10,664,290 B2* | 5/2020 | Trocki | ................ | G06F 9/44526 |
| 2013/0145357 A1* | 6/2013 | Korycki | .............. | G06F 9/44563 |
| | | | | 717/172 |
| 2013/0263160 A1* | 10/2013 | Sandholm | ............... | G06F 9/541 |
| | | | | 719/328 |
| 2014/0109115 A1* | 4/2014 | Low | ..................... | G06F 9/44526 |
| | | | | 719/328 |
| 2015/0128105 A1* | 5/2015 | Sethi | ......................... | G06F 8/36 |
| | | | | 717/106 |

(Continued)

FOREIGN PATENT DOCUMENTS

| WO | 2014062490 | 4/2014 |
|---|---|---|
| WO | 2017205187 | 11/2017 |

OTHER PUBLICATIONS

International Search Report and Written Opinion in Appl. No. PCT/US2020/040265 dated Oct. 15, 2020, 12 pages.

(Continued)

*Primary Examiner* — Arvin Eskandarnia
*Assistant Examiner* — Chhian (Amy) Ling
(74) *Attorney, Agent, or Firm* — Kowert, Hood, Munyon, Rankin & Goetzel, P.C.

(57) ABSTRACT

Techniques are disclosed relating to providing a web application capable of executing within a particular web browser or a client application native to a client platform. The particular web browser and the client platform support differing sets of features. A server computer system hosts the web application for distributing to instances of the client application. The server computer system receives, from a particular instance of the client application that is executing on a client device that implements the client platform, a request for the web application. The server computer system sends the web application to the particular instance to cause the web application to be executed within the particular instance. Such execution of the web application permits the web application to use at least one feature not supported by the particular web browser.

14 Claims, 8 Drawing Sheets

(56) References Cited

U.S. PATENT DOCUMENTS

2016/0253171 A1* 9/2016 Zang .................. G06F 9/45516
717/101

OTHER PUBLICATIONS

Gadyatskaya Olga et al, "Security in the Firefox OS and Tizen Mobile Platforms," Computer, IEEE Computer Society, USA, vol. 47, No. 6, Jun. 1, 2014, pp. 57-63, XP011551330, ISSN: 0018-9162, DOI: 10.1109/MC.2014.165 [retrieved on Jun. 18, 2014] figure 2section Tizen Architecture; p. 59-p. 60.

Fielding UC Irvine J Gettys Compaq/W3c J Mogul Compaq H Frystyk W3c/Mit L Masinter Xerox P Leach Microsoft T Berners-Leew3c/Mit R: "Hypertext Transfer Protocol—Http/1.1; Rfc2616. Txt," Hypertext Transfer Protocol—Http/1.1; Rfc2616.Txt, Internet Engineering Task Force, IETF; Standard, Internet Society (ISOC) 4, Rue Des Falaises CH-1205 Geneva, Switzerland, Jun. 1, 1999 (Jun. 1, 1999), Xp015008399, the whole document.

* cited by examiner

CLIENT APPLICATION FOR WEB APPLICATION EXECUTION

BACKGROUND

Technical Field

This disclosure relates generally to executing a web application in a client application.

Description of the Related Art

Computer systems routinely communicate information with other computer systems over networks, including wide-area networks such as the Internet. One form of communication is the sending of web pages (documents commonly written in Hypertext Markup Language (HTML) and accessible through the World Wide Web) from a server computer system to a client computer system that presents them to a user, who may view and interact with them. In particular, a user can request access to a set of web pages using a web browser and then view and interact with them using the web browser. Such interaction may involve the user providing input to the web browser for the web pages, copying content from the web pages, navigating the web pages using web links, etc.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "network interface configured to communicate over a network" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a processor having eight processing cores, the terms "first" and "second" processing cores can be used to refer to any two of the eight processing cores. In other words, the first and second processing cores are not limited to processing cores 0 and 1, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

The type of experience that a user has when viewing and interacting with web pages is often dependent on the implementation of the web browser that is used. For example, if a web browser implements a location-based feature, then the user can provide their location for an improved experience in which a web page presents location-relevant information to the user. There are, however, many features, such as geofencing, that today's web browsers do not implement. (Geofencing being the ability to perform an action based upon a user being located within a predefined geographic area.) As a result, web browsers, in some cases, are not able to provide a feature-rich experience to users. Moreover, the features that web browsers implement are often not as versatile and capable as the counterparts provided by a client platform (e.g., iOS®) on which the web browsers may execute. It may be desirable to implement an environment that can execute web applications (e.g., web pages) and also provide them with access to more features, including those provided by a client platform.

The present disclosure describes techniques for implementing a client application that is capable of executing web applications and providing them with access to native features that are provided by a client platform. An example of a web application may be a web page and an example of a client application may be an application specifically developed for iOS®. In various embodiments that are described below, a client application that is native to a client platform includes an execution environment in which web applications can be executed and a feature API through which the web applications can invoke features of the client platform. In some embodiments, the feature API includes a set of modules via which a web application may invoke a corresponding set of features of the client platform on which the client application executes.

A server computer system, in various embodiments, hosts a web application that can be distributed to a web browser and a client application upon request. Accordingly, the server computer system may send the web application to a particular instance of the client application that is executing on a client device that implements a client platform corresponding to the client application. The particular instance of the client application is operable to execute the received web application within its execution environment. In various cases, when that web applications is executed within the particular instance, the web application may invoke at least one feature, such as geofencing, that is not supported by the web browser.

These techniques are believed advantageous over prior approaches as they allow for a developer to write one code base (e.g., a web application) that can be served to a browser or a native application that is native to a particular platform. That is, developers may be provided with the ability of developing only one application (which can be executed across different platforms) instead of having to develop a platform-specific application for each platform. For example, instead of developing an application for a web browser, an application for Android™ and an application for iOS®, a developer may develop one application that can be executed by the web browser, Android™, and iOS®. Accordingly, a server computer system may serve the same web application to a web browser and a native application upon request. At runtime, the web application may check which features are available in its runtime container (i.e., the web browser or the native application) and call them where appropriate.

Moreover, these techniques allow web applications to invoke the native features of a client platform, various ones of which may be more versatile and capable than the counterparts provided by web browsers. Accordingly, users may be provided with an improved experience when viewing and interacting with web applications. That is, the web application (without changes to its code) can use native features (that would be missing in the web browser) when running in a native application. A system for implementing these techniques will now be discussed below, starting with FIG. 1.

Figure 1:
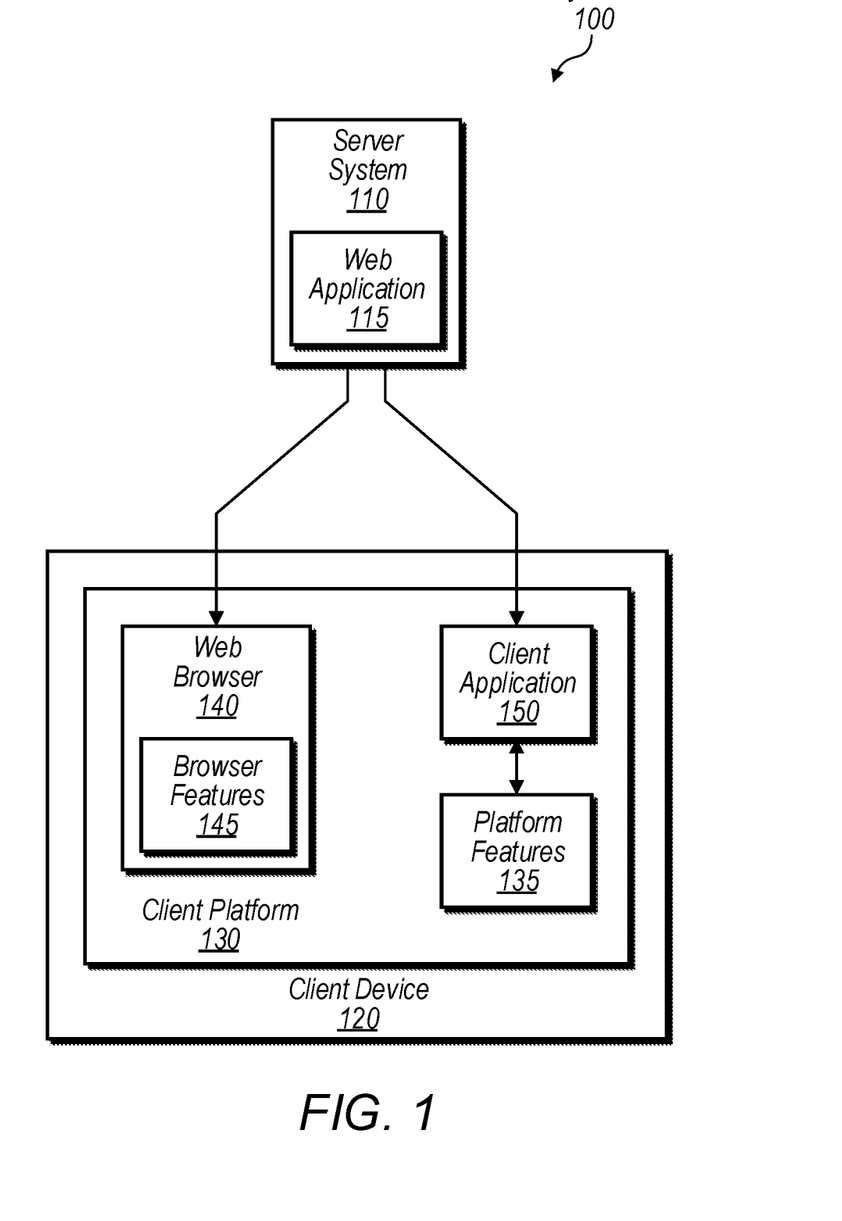
FIG. 1 is a block diagram illustrating example elements of a system that has a server system capable of distributing a web application to a web browser and a client application, according to some embodiments.

Turning now to FIG. 1, a block diagram of a system 100 is shown. System 100 includes components that are implemented via hardware or a combination of hardware and software routines. In the illustrated embodiment, system 100 includes a server system 110 and a client device 120. As further illustrated, server system 110 includes a web application 115 and client device 120 includes client platform 130 having platform features 135, a web browser 140 (with browser features 145), and a client application 150. In some embodiments, system 100 may be implemented differently than shown. As an example, client platform 130 may not include web browser 140—web browser 140 may be executed on a second, different client device 120 that implements the same or a different client platform 130.

Server system 110, in various embodiments, is a system that hosts web application 115 for distribution to other systems including client device 120. Server system 110 may, for example, implement a database management system capable of interacting with tenants, applications (such as web application 115), and databases in order to store, analyze, and serve data. Accordingly, in some embodiments, server system 110 may be a multi-tenant system that receives and manages data from tenants—such data may include web applications 115. In various cases, tenants of server system 110 may develop and upload web applications 115 to server system 110 for distribution to web browsers 140 and client applications 150. Accordingly, in various embodiments, server system 110 may host multiple web applications 115 that are received from one or more tenants and may send such web applications 115 to web browsers 140 and client applications 150 upon request. In some cases, server system 110 may receive an update to a particular web application 115; such an update may permit that web application 115 to invoke additional platform features 135 and/or browser features 135.

Web application 115, in various embodiments, includes a set of software routines that provide a web-based experience when executed. Web application 115 may, for example, be a set of dynamic web pages that a user can view and interact with when rendered by web browser 140 or client application 150. In various embodiments, web application 115 includes software routines that are executable to invoke browser features 145 and/or platform features 135. When executed within web browser 140, web application 115 may invoke browser features 145, and when executed within client application 150, web application 115 may invoke client platform features 135. In various instances, different web applications 115 may be capable of invoking different features 135 and/or 145 from each other—they may invoke different feature sets that have overlap or no overlap in features. For example, one web application 115 may be able to invoke a geofencing feature while another web application 115 cannot (as it may not be designed to).

Client device 120, in various embodiments, is a computer system capable of interacting with server system 110 in a client-server relationship. Client device 120 may be, for example, a desktop computer, a laptop, a smartphone, a smartwatch, etc. In various embodiment, client device 120 executes a client platform 130 upon which software routines, such as web browser 140 and client application 150, may be executed. Client platform 130, in various embodiments, is a set of software routines that provides an environment that is capable of initiating execution of other software routines and subsequent management of that execution. Client platform 130 may be, for example, an operating system, such as iOS® or Android™. In various cases, there may be multiple client devices 120 that interact with server system 110, each of which may be executing a different client platform 130.

Client platform 130 may provide a framework under which applications, such as client application 150, are developed. In various instances, a client application 150 developed for one client platform 130 may implement the same or similar functionality as a client application 150 developed for another client platform 130; however, both client applications 150 may include different software routines. For example, there may be a client application 150 that is specific to the Android™ operating system and a client application 150 specific to the iOS® operating system. In some embodiments, client platform 130 may provide an application store or exchange that allows for various client applications such as client application 150 to be downloaded and installed on client platform 130. In some cases, server system 110 may provide the appropriate client application 150 for a client platform 130 in response to a request from client device 120.

As illustrated, client platform 130 includes platform features 135 that may be invoked by web application 115 via client application 150. Examples of platform features 135 include, but are not limited to, geofencing, artificial intelligence integration (e.g., the ability to issue a command to Siri®), push notifications, microphone access, camera access, Bluetooth® access, and photo access. In some cases, different client platforms 130 may include different platform features 135. As an example, one client platform 130 may implement push notifications while another client platform 130 does not implement that platform feature. As such, a client platform 130 may include platforms features 135 that are not included by another client platform or by web browser 140. In some instances, different client platforms 130 may include the same high-level feature but implement that feature differently. For example, two client platforms 130 may have different implementations of artificial intelligence agents (e.g., Google Assistant™ versus Siri®). These two client platforms 130 support the same feature, although it is implemented differently.

Web browser 140, as used herein, is a program executable to access web pages and other content in a standardized format, such as HTML or XML. These web pages are commonly located on a network, such as the World Wide Web. Examples of web browsers 140 include, but are not limited to, Chrome™, Safari®, Firefox®, and Edge®. As shown, web browser 140 includes browser features 145 that may be invoked by web application 115. Examples of web browser features 145 include, but are not limited to, offline work mode (e.g., a service worker periodically caches data for web application 115 so that it can be loaded even when a user has temporarily lost their Internet connection), push notifications, and Hypertext Transfer Protocol Secure (HTTPS) support. In various embodiments, web browser 140 implements an API that allows for web application 115 to invoke browser features 145 when it is executed within web browser 140.

In various cases, platform features 135 and browser features 145 may include different sets of features. As an example, platform features 135 may include a geofencing feature that is not included in browser features 145. As a result, when web application 115 is executed within client application 150, web application 115 may invoke that geofencing feature. But when web application 115 is executed within web browser 140, it cannot use the geofencing feature. As such, client application 150 may allow for a web application 115 to provide an improved user experience when executed by client application 150 as opposed to web browser 140. In some cases, platform features 135 and browser features 145 may include the same high-level feature, but different implementations—the particular platform feature 135 may be more versatile than the particular browser feature 145. As an example, platform features 135 and browser features 145 may include a push notification feature. The push notification feature 145 of web browser 140 may be able to provide notifications for web application 115 only while web browser 140 is executing on client platform 130. But the push notification feature 135 of client platform 130 may be able to provide notifications for web application 115 even when client application 150 is not executing on client platform 130.

Client application 150, as used herein, is a set of software routines executable to implement an environment in which web application 115 can be executed. Client application 150, in various embodiments, implements an API that allows for web application 115 to invoke platform features 135 of client platform 130. Client application 150 may be a native application that is native to a particular client platform 130. The term "native application" is used herein according to its ordinary and accustomed meaning in the art, and includes an application that is written for a framework supported by a specific client platform. As an example, client application 150 may be written and optimized for the iOS® operating system, and thus be "native" to that platform. Client application 150 may request web application 115 from server system 110 in response to different conditions being met, such as a user opening client application 150 or a user selecting a certain tab within client application 150. Once web application 115 is received, client application 150 may execute web application 115 within the environment implemented by client application 150. As part of that execution, web application 115 may invoke platform features 135 using the API that is provided by client application 150.

Implementing system 100 in this manner is believed advantageous over prior approaches as it allows for web applications to have access to features provided by a client platform. Such features may include features that are not supported by web browsers along with features that are more versatile than their web browser counterparts. Consequently, system 100 may allow for web applications to provide an improved user experience in which users have access to more and better features.

Figure 2:
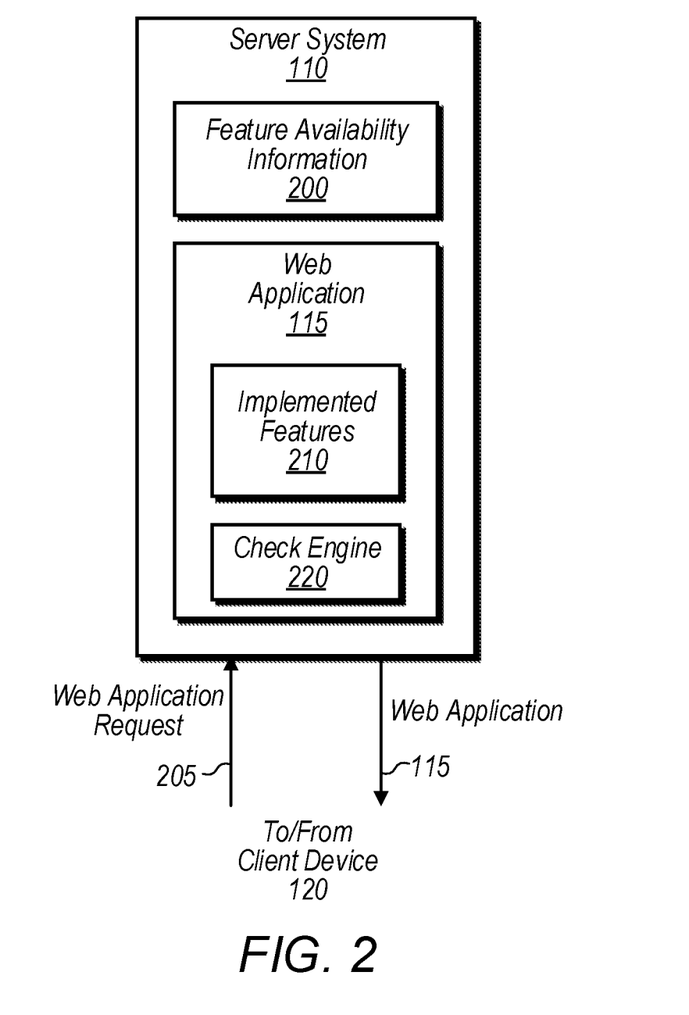
FIG. 2 is a block diagram illustrating example elements of a server system capable of distributing a web application, according to some embodiments.

Turning now to FIG. 2, a block diagram of an example server system 110 is shown. In the illustrated embodiment, server system 110 includes web application 115 and feature availability information 200. As shown, web application 115 includes implemented features 210 and a check engine 220. In some embodiments, server system 110 may be implemented differently than shown. As an example, server system 110 may include multiple, different web applications 115, which may be received from systems associated with one or more different users of server system 110.

Feature availability information 200, in various embodiments, is information indicating platform features 135 that are supported by client application 150. In some instances, feature available information 200 may be an API documentation page that a developer consults when writing the code for their web application 115. Consider an example where client platform 130 provides a platform feature 135 for geofencing and client application 150 supports that platform feature. Accordingly, feature availability information 200 may indicate that the geofencing platform feature 135 is available for invoking by a web application 115 via client application 150. With that knowledge, a developer may code their web application 115 to be able to invoke the geofencing platform feature 135 via client application 150. In various embodiments, there are multiple client applications 150, each of which may be developed for a certain client platform 130. Feature availability information 200 may indicate, for each client application 150, the platform features 135 that are available for invoking by a web application 115 via that client application 150. As an example, feature availability information 200 might indicate that a geofencing platform feature 135 is available on one particular client platform 130 (via the corresponding client application 150) and a push notification platform feature 135 is available on another particular client platform 130 (via the corresponding client application 150).

In various embodiments, server system 110 causes feature availability information 200 to be presented to a user (e.g., by sending information 200 to a client device for presenting to that user) in response to a request for information 200. As an example, when developing a web application 115, a developer may wish to know which platform features 135 are available via a particular client application 150. As such, that developer may request (using a client device) feature availability information 200 from server system 110. In some cases, feature availability information 200 may be stored at an external system that provides it upon request.

Implemented features 210, in various embodiments, are features that a web application 115 is capable of invoking when it is executed. In some cases, implemented features 210 may include both features from browser features 145 of web browser 140 and platform features 135 of client platform 130. Accordingly, when executed within web browser 140, web application 115 may invoke browser features 145 identified by implemented features 210. When executed within client application 150, web application 115 may invoke platform features 135 identified by implemented features 210. Thus, web application 115 may invoke the appropriate features based on the environment in which it is executed. In some embodiments, implemented features 210 may include features corresponding to multiple web browsers 140 and/or client platforms 130.

Check engine 220, in various embodiments, checks for implemented features 210 that are available for invoking by web application 115 when executed. In some cases, such as when web application 115 is executed in client application 150, check engine 220 may register those features (via an API) that are available for invoking. After registering features, web application 115 may then invoke those features (e.g., by making API calls to web browser 140 or client application 150). In some embodiments, check engine 220 performs a progressive check where it checks for available platform features 135 before checking for browser features 145 (or vice versa in some cases).

As shown, server system 110 receives a web application request 205 from client device 120 for a web application 115. In various cases, such as when server system 110 hosts different web applications 115, web application request 205 may identify a specific web application 115 to be returned. As an example, web application request 205 might identify a uniform resource locator (URL) for a particular web application 115. In response to receiving a web application request 205, server system 110 may return the appropriate web application 115 to the requestor (e.g., web browser 140 or client application 150 of client device 120) for execution. When web application 115 is executed, check engine 220 may check for any available features and register them to allow for subsequent invocation of those features.

Figure 3:
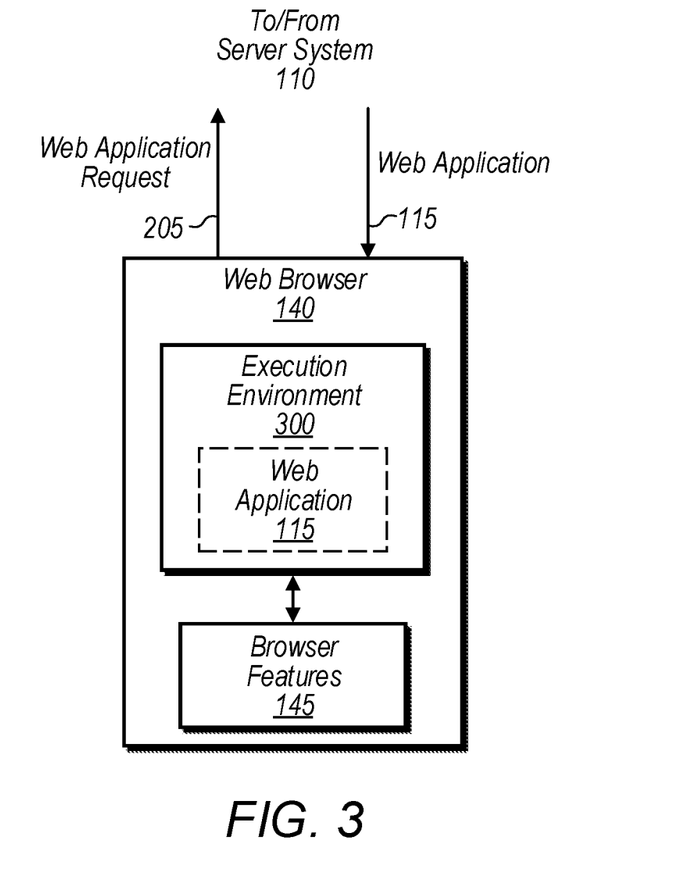
FIG. 3 is a block diagram illustrating example elements of a web browser capable of executing a web application, according to some embodiments.

Turning now to FIG. 3, a block diagram of an example web browser 140 is shown. In the illustrated embodiments, web browser 140 includes browser features 145 and an execution environment 300. As depicted, web application 115 can execute within execution environment 300. In some embodiments, web browser 140 may be implemented differently than shown. For example, web browser 140 may include multiple execution environments 300 that are capable of executing multiple web applications 115 concurrently.

As explained earlier, web browser 140 may receive web application 115 in response to issuing a web application request 205 to server system 110. Web browser 140 may issue web application request 205 in response to a user submitting a URL that directs web browser 140 to server system 110. After receiving web application 115, web browser 140 may execute web application 115 within execution environment 300.

Execution environment 300, in various embodiments, is a software environment that is capable of executing web application 115. When executing within execution environment 300, web application 115 may invoke browser features 145 using an API provided by web browser 140. In some cases, web browser 140 may include multiple execution environments 300, each of which may execute a respective web application 115. Each execution environment 300 may be associated with one of multiple tabs maintained by web browser 140.

Figure 4:
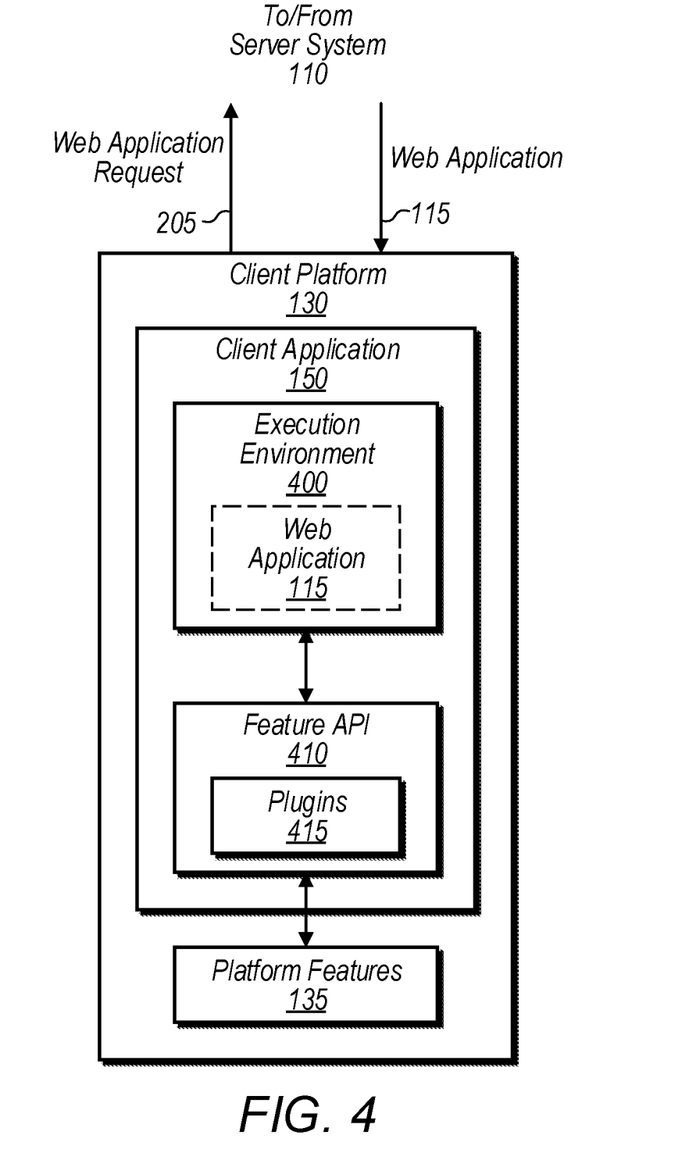
FIG. 4 is a block diagram illustrating example elements of a client application capable of executing a web application, according to some embodiments.

Turning now to FIG. 4, a block diagram of an example client application 150 is shown. In the illustrated embodiments, client application 150 includes an execution environment 400 and a feature application programming interface (API) 410. As depicted, client application 150 operates on client platform 130, which includes platform features 135. As further illustrated, feature API 410 includes plugins 415, and web application 115 can execute within execution environment 400. Client application 150 may be implemented differently than shown. As an example, client application 150 may include multiple execution environments 400 capable of executing multiple web applications 115 concurrently.

As noted earlier, client application 150 may receive web application 115 in response to issuing a web application request 205 to server system 110. Client application 150 may issue web application request 205 in response to a user navigating through client application 150—e.g., a user may select a tab of client application 150, causing client application 150 to issue a web application request 205. After receiving web application 115, client application 150 may execute web application 115 within execution environment 400.

Execution environment 400, in various embodiments, is a software environment that is capable of executing web application 115. In some embodiments, environment 400 includes a container object that allows for web content, such as web application 115, to be executed within an application that is native to a client platform 130. For example, a client application 150 that is developed for the Android™ operating system may include a webview object that allows for web application 115 to be rendered. When executing within execution environment 400, web application 115 may use feature API 410 to invoke platform features 135.

Feature API 410, in various embodiments, is an API that permits web application 115 to invoke platform features 135 using plugins 415. A plugin 415, in various embodiments, is a set of software routines executable to interface with a corresponding platform feature 135. In various instances, a plugin 415 may be a software wrapper that wraps around the corresponding platform feature 135. A plugin 415 may hide the underlying complexity of a platform feature 135 and present a consistent calling mechanism for invoking that platform feature. This may allow for web application 115 to issue the same call on different client platforms 130 to invoke the same platform feature 135, including the cases in which the underlying implementation for that platform feature 135 is different. That is, a plugin 415 may provide a level of abstraction for invoking a platform feature 135.

When executed within client application 150, web application 115 may register for the features included in its implemented features 210. Web application 115 may then invoke ones of those platform features 135 by issuing feature API 410 calls. Such calls may cause plugins 415 to invoke corresponding platforms features 135, which may return a result. The result may be passed back to web application 115. In various cases, client platform 130 may implement different versions of the same particular platform feature 135. Accordingly, feature API 410 may include support for one or more of those different versions of that platform feature 135. When executing within execution environment 400, web application 115 may identify and register for a particular version based on the version that web application 115 has been written to invoke. Web application 115 may then invoke that particular version.

Figure 5:
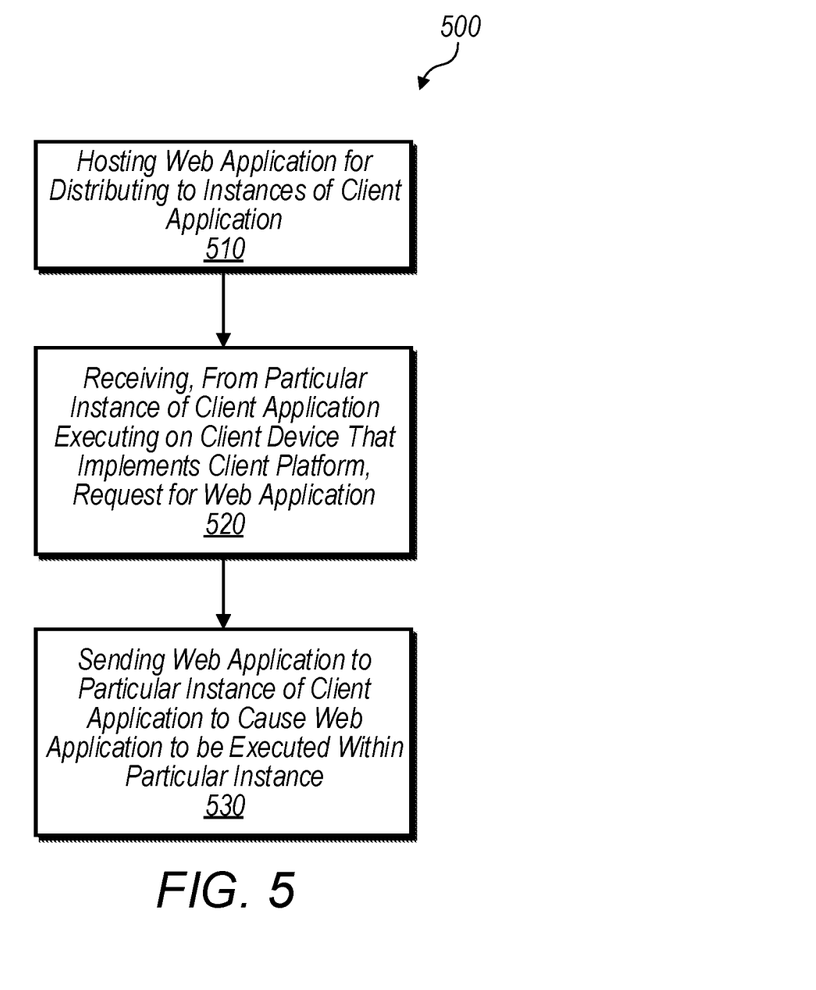
FIGS. 5 and 6 are flow diagrams illustrating example methods relating to providing a web application, according to some embodiments.

Turning now to FIG. 5, a flow diagram of a method 500 is shown. Method 500 is one embodiment of a method performed by a computer system such as server system 110 in order to provide a web application (e.g., web application 115) that is capable of executing within a particular web browser (e.g., a particular web browser 140) or within a client application (e.g., client application 150) that is native to a client platform (e.g., client platform 130). In various cases, the particular web browser and the client platform may support differing sets of features (e.g., browser features 145 versus platform features 135). In some embodiments, method 500 may include additional steps than shown—e.g., the computer system may receive an update to the web application.

Method 500 begins in step 510 with the computer system hosting the web application for distributing to instances of the client application. The client application may implement a set of modules (e.g., plugins 415) that enable the web application to invoke the set of features supported by the client platform. As a result, the web application, when executing within an instance of the client application, may be capable of invoking at least one feature not supported by the particular web browser. The computer system accesses, in various embodiments, feature information (e.g., feature availability information 200) that identifies the set of modules implemented by the client application. Accordingly, in response to a second request for the feature information, the computer system may cause the feature information to be presented (e.g., via a graphical interface) to a user associated with the second request.

In step 520, the computer system receives, from a particular instance of the client application executing on a client device (e.g., client device 120) that implements the client platform, a request (e.g., web application request 205) for the web application.

In step 530, the computer system sends the web application to the particular instance of the client application to cause the web application to be executed within the particular instance. Execution of the web application within the particular instance may permit the web application to invoke the at least one feature not supported by the particular web browser. In some embodiments, the web application is capable of invoking a plurality of features, including features supported by the particular web browser and the client platform. The web application may be capable of identifying, when executing within the particular web browser or within the client application, particular ones of the plurality of features that are available for invoking by the web application. In some embodiments, the client platform supports a plurality of versions for a particular feature. As such, the web application may be capable of identifying a particular one of the plurality of versions based on the particular version matching a version invokable by the web application. The web application may be capable of invoking the particular version of the particular feature.

The particular web browser may execute on a second client device, which may be the client device that executes the particular instance. The computer system may receive, from the particular web browser, a second request (e.g., web application request 205) for the web application. As such, the computer system may send the web application to the particular web browser to cause the web application to be executed within the particular web browser. The web application, when executing within the particular web browser, may not be capable of invoking the at least one feature.

The computer system may receive, from a second particular instance of a second client application executing on a second client device that implements a second client platform, a second request (e.g., web application request 205) for the web application. The second client platform may support a set of different features than the particular web browser and the client platform. The computer system may send the web application to the second particular instance of the second client application to cause the web application to be executed within the second particular instance. Execution of the web application within the second particular instance may permit the web application to invoke at least one feature not supported by the particular web browser and the client platform. In some embodiments, the second client platform corresponds to a different operating system than the client platform.

In various embodiments, the computer system hosts a second web application for distributing to instances of the client application. The second web application may be capable of invoking a different set of features than the web application. In response to a second request from the particular instance for the second web application, the computer system may send the second web application to the particular instance to cause the second web application to be executed within the particular instance. Execution of the second web application within the particular instance may permit the second web application to invoke one or more features not supported by the web application.

Figure 6:
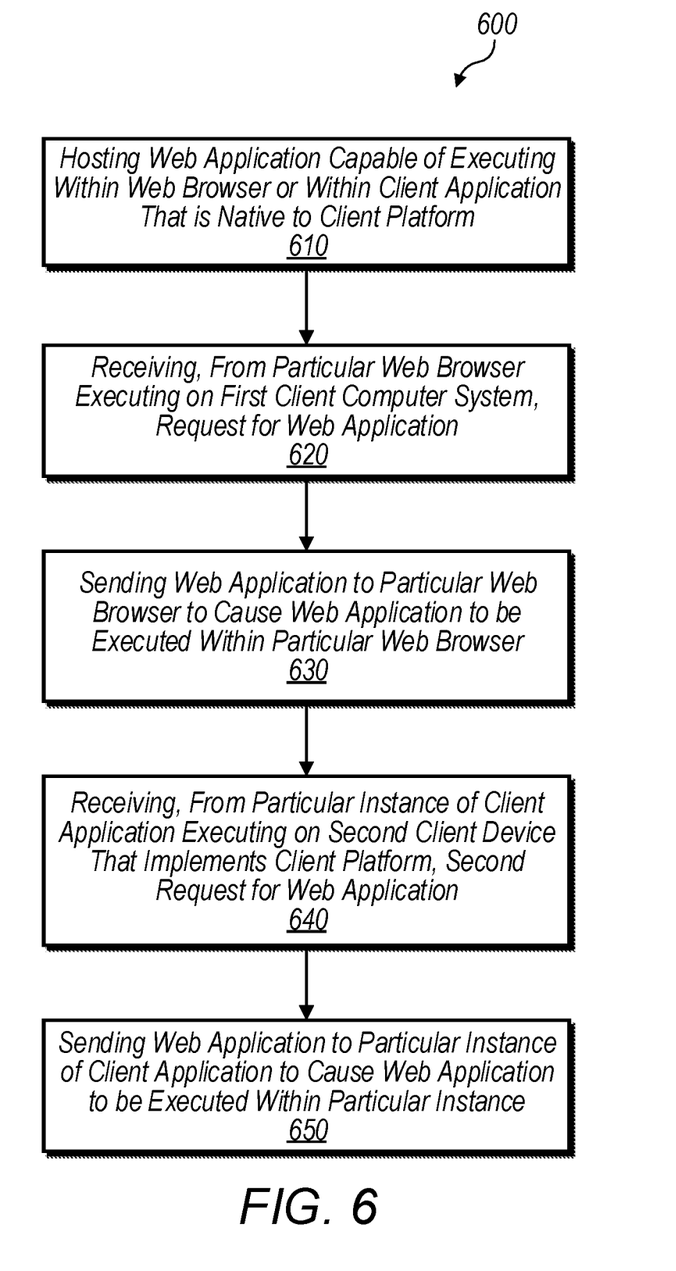

Turning now to FIG. 6, a flow diagram of a method 600 is shown. Method 600 is one embodiment of a method performed by a computer system such as server system 110 in order to provide a web application (e.g., web application 115) that is capable of executing within a particular web browser (e.g., a particular web browser 140) or within a client application (e.g., client application 150) that is native to a client platform (e.g., client platform 130). In various cases, the particular web browser and the client platform may support differing sets of features (e.g., browser features 145 versus platform features 135). Method 600 may be performed by executing a set of program instructions stored on a non-transitory computer-readable medium. In some embodiments, method 600 may include additional steps than shown. For example, the computer system may receive an update to the web application.

Method 600 begins in step 610 with the computer system hosting the web application capable of executing within a plurality of environments that include a web browser and the client application that is native to the client platform.

In step 620, the computer system receives, from a particular web browser executing on a first client computer system (e.g., a client device 120), a request (e.g., web application request 205) for the web application. The particular web browser may implement a first set of features (e.g., browser features 145) that is different than a second set of features (e.g., platform features 135) implemented by the client application. The first and second different sets of features may share one or more features—i.e., there may be at least one feature that is included in the two sets. In various embodiments, the computer system accesses feature information (e.g., feature availability information 200) that identifies the second set of features implemented by the client application. The computer system may cause the feature information to be presented to a user in response to a third request for the feature information.

In step 630, the computer system sends the web application to the particular web browser to cause the web application to be executed within the particular web browser. Execution of the web application within the particular web browser may permit the web application to invoke the first set of features.

In step 640, the computer system receives, from a particular instance of the client application executing on a second client device that implements the client platform, a second request (e.g., web application request 205) for the web application. In some instances, prior to receiving the second request for the web application, the computer system may send the client application to the second client device for execution on the second client device.

In step 650, the computer system sends the web application to the particular instance of the client application to cause the web application to be executed within the particular instance. Execution of the web application within the particular instance may permit the web application to invoke the second set of features.

In various embodiments, the computer system hosts a second web application that is capable of executing within the particular web browser or within the client application. The computer system may receive a third request (e.g., web application request 205) from the particular instance for the second web application. Accordingly, the computer system may send the second web application to the particular instance to cause the second web application to be executed within the particular instance. Execution of the second web application within the particular instance may permit the second web application to invoke at least one feature not invokable by the web application.

In various embodiments, the computer system receives, from a second particular instance of a second client application executing on a third client device that implements a second client platform, a third request for the web application. The second client application may implement a third set of features that is different from the first and second sets of features. The computer system may send the web application to the second particular instance of the second client application to cause the web application to be executed within the second particular instance. Execution of the web application within the second particular instance may permit the web application to invoke the third set of features.

Figure 7:
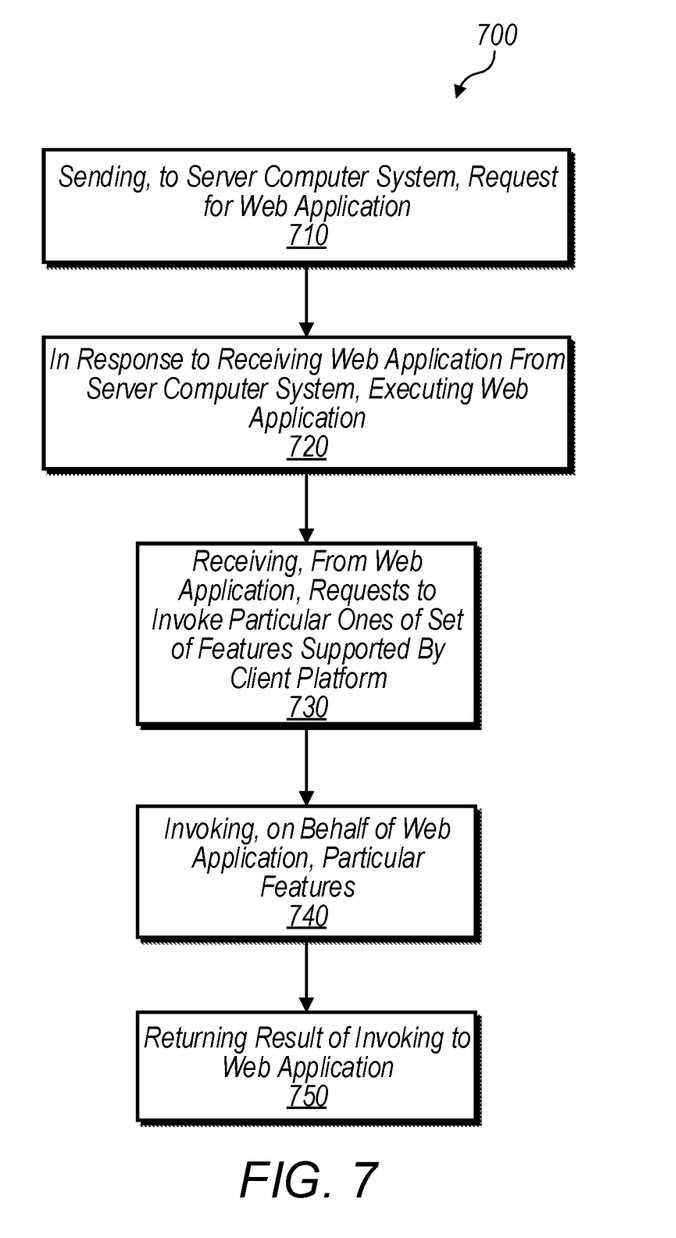
FIG. 7 is a flow diagram illustrating an example method relating to executing a web application, according to some embodiments.

Turning now to FIG. 7, a flow diagram of a method 700 is shown. Method 700 is one embodiment of a method performed by a particular instance of a client application (e.g., client application 150) in order to execute a web application (e.g., web application 115) that is capable of being executed in a web browser (e.g., web browser 140) or in the client application that is native to a client platform (e.g., client platform 130). The web browser and the client platform may support differing sets of features (e.g., browser features 145 versus platform features 135). In some embodiments, method 700 may include additional steps than shown—e.g., the particular instance may receive an update that allows it to support additional features of the client platform.

Method 700 begins in step 710 with the particular instance sends, to a server computer system (e.g., server system 110), a request (e.g., web application request 205) for the web application. The client application may implement a set of modules (e.g., plugins 415) that enable the web application to invoke the set of features supported by the client platform. The web application may be a web page hosted by the server computer system.

In step 720, in response to receiving the web application from the server computer system, the particular instance executes the web application. In various embodiments, such execution includes performing steps 730-750.

In step 730, the particular instance receives, from the web application, requests to invoke particular ones of the set of features supported by the client platform. In some cases, in response receiving at least one request from the web application to register the particular features, the particular instance may register the particular features such that the web application is permitted to cause the particular instance to invoke the particular features on behalf of the web application.

In step 740, the particular instance invokes, on behalf of the web application, the particular features. In step 750, the particular instance returns a result of the invoking to the web application.

In various embodiments, the particular instance sends a request for a second web application. In response to receiving the second web application, the particular instance may execute the second web application. Such execution may include the particular instance receiving, from the second web application, requests to invoke second particular ones of the set of features supported by the client platform. The second particular features may include at least one feature not included in the particular features. The execution may further include the particular instance invoking, on behalf of the second web application, the second particular features and returning, to the second web application, a second result of the invoking of the second particular features.

Exemplary Computer System

Figure 8:
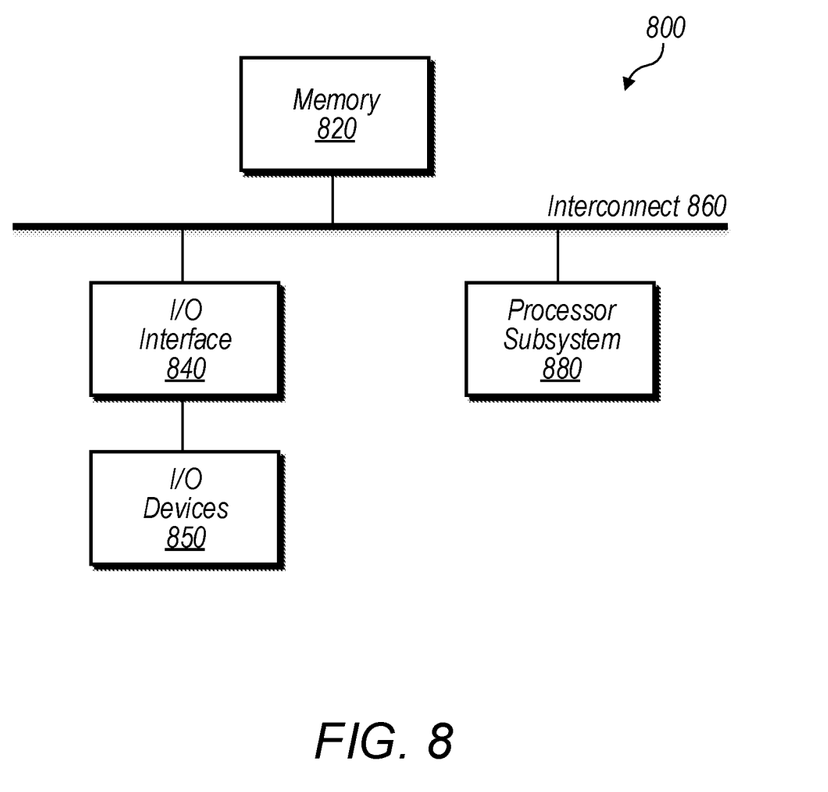
FIG. 8 is a block diagram illustrating an example computer system, according to some embodiments.

Turning now to FIG. 8, a block diagram of an exemplary computer system 800, which may implement server system 110 and/or client device 120, is depicted. Computer system 800 includes a processor subsystem 880 that is coupled to a system memory 820 and I/O interfaces(s) 840 via an interconnect 860 (e.g., a system bus). I/O interface(s) 840 is coupled to one or more I/O devices 850. Computer system 800 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 800 is shown in FIG. 8 for convenience, system 800 may also be implemented as two or more computer systems operating together.

Processor subsystem 880 may include one or more processors or processing units. In various embodiments of computer system 800, multiple instances of processor subsystem 880 may be coupled to interconnect 860. In various embodiments, processor subsystem 880 (or each processor unit within 880) may contain a cache or other form of on-board memory.

System memory 820 is usable store program instructions executable by processor subsystem 880 to cause system 800 perform various operations described herein. System memory 820 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 800 is not limited to primary storage such as memory 820. Rather, computer system 800 may also include other forms of storage such as cache memory in processor subsystem 880 and secondary storage on I/O Devices 850 (e.g., a hard drive, storage array, etc.). In some embodiments, these other forms of storage may also store program instructions executable by processor subsystem 880. In some embodiments, program instructions that when executed implement web application 115, client platform 130, web browser 140, and/or client application 150 may be included/stored within system memory 820.

I/O interfaces 840 may be any of various types of interfaces configured to couple to and communicate with other devices, according to various embodiments. In one embodiment, I/O interface 840 is a bridge chip (e.g., Southbridge) from a front-side to one or more back-side buses. I/O interfaces 840 may be coupled to one or more I/O devices 850 via one or more corresponding buses or other interfaces. Examples of I/O devices 850 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 800 is coupled to a network via a network interface device 850 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for providing a first web application that is capable of executing within a web browser and within a first client application that is native to a first client platform, wherein the method comprises:

hosting, by a server computer system, the first web application for distribution to the first client application and the web browser, wherein the first client application implements a set of modules that enable the first web application to invoke a set of features supported by the first client platform;

receiving, by the server computer system from the first client application executing on the first client platform, a request for the first web application;

receiving, by the server computer system from the web browser executing on the same first client platform, a request for the first web application;

receiving, by the server computer system from a second client application executing on a second client platform, a request for the first web application, wherein the second client platform supports a set of different features than the web browser and the first client platform, and wherein the second client platform corresponds to a different operating system than the first client platform; and sending, by the server computer system, the first web application to the first client application, the second client application, and the web browser for execution, wherein execution of the first web application within the first client application permits the first web application to invoke at least one feature of the first client platform that is not supported by the web browser, and wherein execution of the first web application within the second client application permits the first web application to invoke at least one feature not supported by the web browser and the first client platform.

2. The method of claim 1, further comprising:

accessing, by the server computer system, feature information that identifies the set of modules implemented by the first client application; and in response to a request for the feature information, the server computer system causing the feature information to be presented to a user.

3. The method of claim 1, further comprising:

receiving, by the server computer system, an update to the first web application, wherein the first web application is updated such that the first web application is capable of invoking an additional feature supported by the first client platform but not by the web browser.

4. The method of claim 1, further comprising:

hosting, by the server computer system, a second web application for distribution to the first client application and the web browser, wherein the second web application is capable of invoking a different set of features than the first web application; and in response to a request from the first client application for the second web application, the server computer system sending the second web application to the first client application, wherein execution of the second web application within the first client application permits the second web application to invoke one or more features not supported by the first web application.

5. The method of claim 1, wherein the first web application is capable of invoking a plurality of features, including features supported by the web browser and the first client platform, and wherein the first web application is capable of identifying, when executing within the web browser or within the first client application, particular ones of the plurality of features that are available for invoking by the first web application.

6. The method of claim 1, wherein the first client platform supports a plurality of versions for a particular feature, and wherein the first web application is capable of:

identifying a particular one of the plurality of versions based on the particular version matching a version invokable by the first web application; and invoking the particular version of the particular feature.

7. A non-transitory computer readable medium having program instructions stored thereon that are executable by a computer system to cause the computer system to perform operations comprising:

hosting a first web application capable of executing within a plurality of environments that include a web browser and a first client application that is native to a first client platform;

receiving, from the web browser executing on a first client computer system, a request for the first web application, wherein the web browser implements a first set of features that does not include a particular feature included in a second set of features implemented by the first client application;

sending the first web application to the web browser to cause the first web application to be executed within the web browser, wherein execution of the first web application within the web browser permits the first web application to invoke the first set of features;

receiving, from the first client application executing on the first client computer system that implements the first client platform, a request for the first web application;

sending the first web application to the first client application to cause the first web application to be executed within the first client application, wherein execution of the first web application within the first client application permits the first web application to invoke the second set of features;

receiving, from a second client application executing on a second client computer system that implements a second client platform, a request for the first web application, wherein the second client application implements a third set of features that is different from the first and second sets of features; and sending the first web application to the second client application to cause the first web application to be executed within the second client application, wherein execution of the first web application within the second client application permits the first web application to invoke the third set of features.

8. The medium of claim 7, wherein the operations further comprise:

hosting a second web application that is capable of executing within the web browser and within the first client application;

receiving a request from the first client application for the second web application; and sending the second web application to the first client application to cause the second web application to be executed within the first client application, wherein execution of the second web application within the first client application permits the second web application to invoke at least one feature not invokable by the first web application.

9. The medium of claim 7, wherein the operations further comprise:

accessing feature information that identifies the second set of features implemented by the first client application; and causing the feature information to be presented to a user in response to a request for the feature information.

10. The medium of claim 7, wherein the operations further comprise:

sending the first client application to the first client computer system for execution on the first client computer system.

11. A method for executing a first web application that is capable of being executed in a web browser and in a client application that is native to a client platform, wherein the web browser and the client platform support differing sets of features, comprising:

sending, to a server computer system by the client application that is executing on a client device that implements the client platform, a request for the first web application, wherein the client application implements a set of modules that enable the first web application to invoke the set of features supported by the client platform; and in response to receiving the first web application from the server computer system, the client application executing the first web application, including:

receiving, from the first web application, a request to invoke a particular feature of the set of features supported by the client platform, wherein the particular feature is not supported by the web browser that is operable to execute on the same client platform, and wherein the client application supports at least two different versions of the particular feature based on different versions of the first web application;

invoking, on behalf of the first web application, the particular feature; and returning a result of the invoking to the first web application.

12. The method of claim 11, further comprising:

in response receiving a request from the first web application to register the particular feature, the client application registering the particular feature such that the first web application is permitted to cause the client application to invoke the particular feature on behalf of the first web application.

13. The method of claim 11, further comprising:

sending, by the client application, a request for a second web application; and in response to receiving the second web application, the client application executing the second web application, including:

receiving, from the second web application, requests to invoke second particular ones of the set of features supported by the client platform, wherein the second particular features includes at least one feature not supported by the first web application;

invoking, on behalf of the second web application, the second particular features; and returning, to the second web application, a second result of the invoking of the second particular features.

14. The method of claim 11, wherein the first web application is a web page hosted by the server computer system.

* * * * *